June 7, 1960     C. P. POND ET AL     2,939,704
ATHLETIC TRAINING ACCESSORY
Filed July 15, 1958

INVENTOR
CHARLES P. POND
F. R. INSKIP

BY
ATTORNEY

United States Patent Office 2,939,704
Patented June 7, 1960

2,939,704

ATHLETIC TRAINING ACCESSORY

Charles P. Pond, 2005 Boudreau Drive, Urbana, Ill., and Francis R. Inskip, 614 W. Green St., Champaign, Ill.

Filed July 15, 1958, Ser. No. 748,730

5 Claims. (Cl. 272—60)

This invention relates generally to athletic apparatus and more particularly to apparatus for teaching handstands and related movements of strength, flexibility and balance in the field of gymnastics and dancing.

In learning to do a handstand the performer, prior to the present invention, required the aid of one or more assistants. These assistants would help the student attain the vertical handstand position, and once this position was achieved, the aid of the assistants would be needed to help the performer maintain his balance.

Accordingly, it is an object of the present invention to develop an apparatus for teaching acrobatics which may be successfully used by the performer without the aid of any assistant.

Another object of the invention is to produce an apparatus for teaching the art of handstands which stabilizes the performer by the support and balance it gives through his arms.

A further object is to develop an apparatus of the type above referred to having safety means for preventing any damage to the student's arms, should he fall forward during the performance of a handstand.

The above objects and advantages of the invention will appear more fully from the following description considered together with the accompanying drawings, in which.

Similar reference characters designate corresponding parts throughout the several figures of the drawing.

Figure 1:
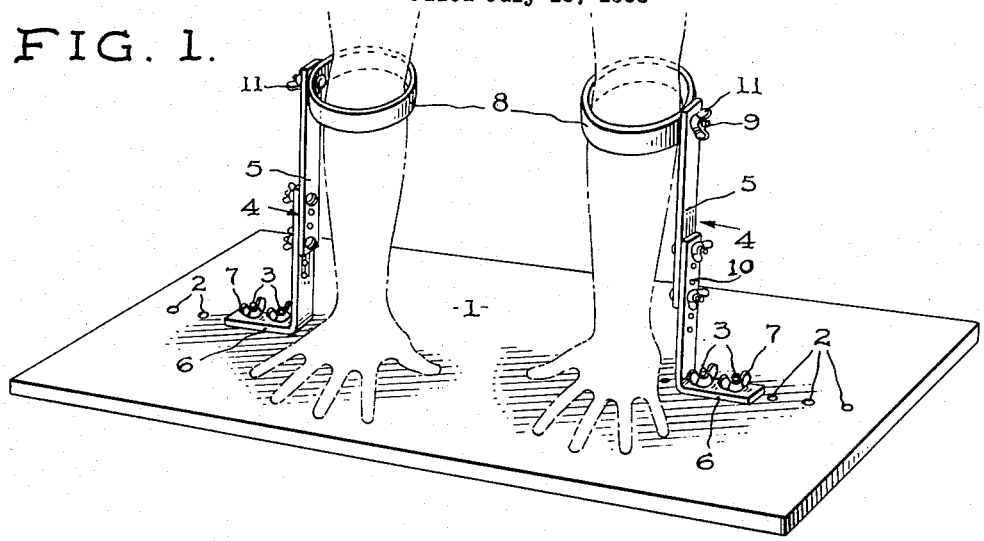
Figure 1 is a general perspective view of the apparatus.
Figure 2:
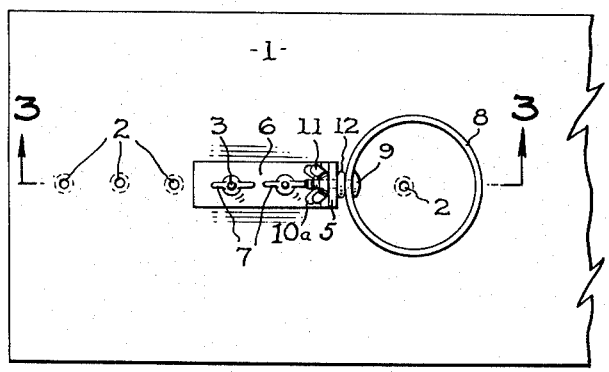
Figure 2 is a partial top plan view.

In the drawings the invention is shown as comprising a platform or base plate 1 having a plurality of coaxially aligned openings 2 for receiving bolts 3.

Figure 3:
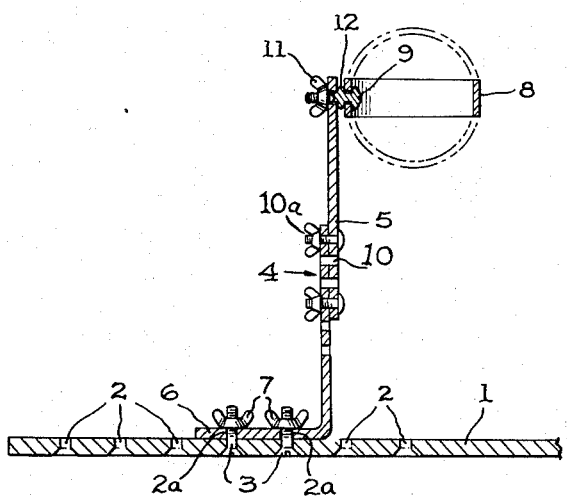
Figure 3 is a partial transverse view in cross section, taken along the line 3—3 of Figure 2 and illustrating in broken lines an alternate position of the arm rings.

A pair of bracket supports 4, consisting of vertical members 5 and right angle foot sections 6, are each provided with two or more bolt receiving openings 2a (Figure 3). Suitable quick release fastening means such as the wing nuts 7 shown in the several figures are used with bolts 3 to secure said brackets 4 to the base plate 1. As will be most clearly seen in Figure 3, any two adjacent openings 2 may be selected to register with openings 2a for attaching the brackets 4 to the base plate. The plurality of openings 2 allow for lateral adjustment between the brackets according to the size of the user of the apparatus.

The overlapping ends of the vertical members 5 and foot sections 6 are provided with a plurality of holes 10 for receiving quick release fasteners 10a. Any pair of cooperating openings 10 may be selected to adjust the height of the apparatus according to the length of the pupil's arms.

It should be noted that the base plate and brackets may be constructed of any suitable material such as metal, plastic or wood, and even though their overall dimensions are not critical, it is necessary that a sufficient number of openings 2 be provided in the base plate to insure proper adjustment of the apparatus for use by children and adults of all physical sizes.

Attached to the vertical member 5 of each bracket 4 is an arm ring 8 having a bolt 9 loosely mounted through its wall. The arm rings 8 are connected to the brackets by passing bolts 9 through holes located at the uppermost end of each vertical member. Suitable quick release fasteners such as wing nuts 11 secure bolts 9 to the brackets. The bolts 9 are provided with a collar or check nut 12 spaced between the arm rings and vertical members 5 so that when wing nuts 11 are tightened the arm rings will remain free to swivel or rotate upon the bolts 9 as indicated by the broken lines in Figure 3. In using the apparatus the breadth of the performer's shoulders and the length of his arms determine the proper adjustment of the brackets and arm rings, respectively. The performer bends over at the waist, puts his arms through the arm rings, and places his hands flat upon the base plate as illustrated in Figure 1. Then by kicking his feet and legs into the air, he assumes the handstand position.

In a handstand the arms are maintained in a straight, locked position. It will therefore be seen that the arm rings 8 which are rigidly secured against any lateral movement will act as a fixed fulcrum upon the arms of the performer, thereby stabilizing the body and enabling the performer to maintain a more perfect balance.

If a student acrobat who has not yet mastered the correct body position should fall forward, that is, upon his back, while practicing handstands, there is no chance of his spraining or breaking his arms while using the apparatus. This safety feature is assured because of the swivel attachment of the arm rings, which allows them to only rotate transversely of the longitudinal axis of the bolts 9. It will be apparent that as the hands are lifted off of the base plate when the student falls forward, the arm rings will rotate with the arms, thereby preventing any damage to the performer's arms.

We claim:

1. In an apparatus for teaching acrobatics, a platform having a plurality of aligned openings therein, a pair of right-angled brackets disposed vertically of said platform and provided with openings, said openings in said brackets cooperating with any of said openings in said platform to receive quick release fastening means to secure said brackets to said platform in spaced apart relationship whereby said brackets may be mounted to provide various adjusted distances between one another, an arm ring rotatably attached to the upper portion of each of said brackets by releasable connecting means, the diametrical axis about which said arm rings freely rotate corresponding to the longitudinal axis of said connecting means and parallel to said platform.

2. An apparatus for assisting the teaching of acrobatics, comprising, a platform, a pair of upright members adjustably secured to the platform for varying the distance between said members, each of said members comprising an upper vertical portion and a foot section, means effecting change in elevation of the upper portions of said upright members relative to the platform, and ring elements pivotally connected to the upper end portions of the upright members for rotational movement about an axis at right angles thereto.

3. An apparatus according to claim 2 wherein each of said foot sections of said upright members is disposed away from the other of said brackets.

4. An apparatus according to claim 2 wherein said rotating ring elements are connected to opposite sides of said upright members.

5. An apparatus for teaching acrobatics, comprising, a platform, a pair of upright brackets fixedly secured in a vertical position on said platform, a pair of arm receiving rings, means for pivotally attaching said rings to the upper portion of said upright brackets, said means including fastening members attached to the upper portion of said brackets and passing through a single circumferential point on each of said arm receiving rings, whereby said arm receiving rings are capable of unlimited rotational movement about an axis transverse of said upright brackets.

References Cited in the file of this patent

UNITED STATES PATENTS

| | | |
|---|---|---|
| 2,345,085 | Albert et al. | Mar. 28, 1944 |
| 2,580,932 | Lantry | Jan. 1, 1952 |